United States Patent
Loose et al.

(10) Patent No.: US 6,735,868 B2
(45) Date of Patent: May 18, 2004

(54) SURFACE TREATMENT METHOD

(75) Inventors: Michael D. Loose, Denver, PA (US); Daniel J. Donnelly, Beaver Falls, PA (US); Clarence M. Clabaugh, Gettysburg, PA (US)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 09/947,351

(22) Filed: Sep. 7, 2001

(65) Prior Publication Data

US 2003/0046815 A1 Mar. 13, 2003

(51) Int. Cl.[7] ............................................. B21D 53/10
(52) U.S. Cl. ............................. 29/898.13; 29/898.066; 29/898.063; 384/569
(58) Field of Search ................. 29/898.066, 898.08, 29/898.09, 898.063, 898.13, 724, 90.7, 558, 557, 33 R; 409/131, 132; 451/52, 49, 50, 51, 262; 384/569, 565, 571, 490, 625

(56) References Cited

U.S. PATENT DOCUMENTS

| | | | | |
|---|---|---|---|---|
| 2,972,841 A | * | 2/1961 | Anderson | |
| 3,005,297 A | * | 10/1961 | Spicacci | |
| 3,077,061 A | * | 2/1963 | John | |
| 4,567,695 A | * | 2/1986 | Schaeffler | |
| 4,973,068 A | * | 11/1990 | Lebeck | |
| 5,245,793 A | * | 9/1993 | Schmitz | |
| 5,503,481 A | * | 4/1996 | Hashimoto et al. | ......... 384/569 |

* cited by examiner

Primary Examiner—Charles T. Jordan
Assistant Examiner—T. Nguyen
(74) Attorney, Agent, or Firm—Burns, Doane, Swecker & Mathis, L.L.P.

(57) ABSTRACT

A method of improving the performance and service life of a new bearing component, the component having at least one dynamic frictional surface the method includes subjecting the at least one dynamic frictional surface to a surface finishing operation thereby providing the surface with a surface roughness value $R_A$ of approximately 18–80 μin, preferably greater than 24 μin, and most preferably 30–36 μin. The method is particularly advantageous when applied to bearing components utilized in high-load, low rpm applications.

13 Claims, 2 Drawing Sheets

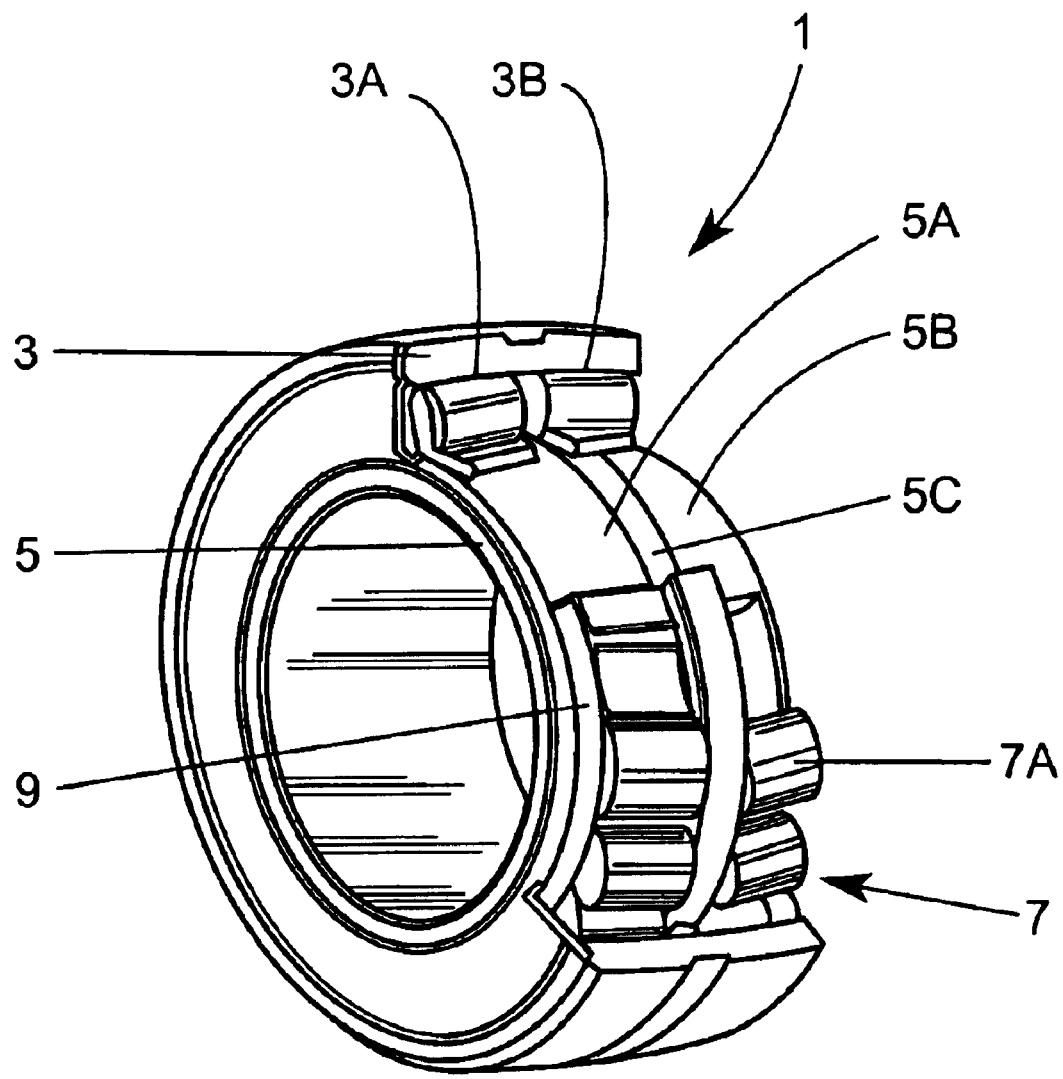
CONVENTIONAL
FIG. 1

SURFACE TREATMENT METHOD

FIELD OF THE INVENTION

The present invention is directed to an improved surface treatment technique. In particular, the present invention is directed to a method of providing dynamic frictional surfaces, such as those disposed on new bearing components, with a surface finish that improves performance and extends service life.

BACKGROUND OF THE INVENTION

In the description of the background of the present invention that follows reference is made to certain structures and methods, however, such references should not necessarily be construed as an admission that these structures and methods qualify as prior art under the applicable statutory provisions. Applicants reserve the right to demonstrate that any of the referenced subject matter does not constitute prior art with regard to the present invention.

Dynamic load-bearing devices, such as bearings, are well-known and widely utilized. Individual components within such devices have surfaces that in contact, an which move relative to one another. These surfaces (hereafter "dynamic frictional surface(s)") are also provided with a particular surface finish during the manufacturing process, typically with the object of minimizing friction.

A continuous caster is a well-known device utilized in the steel manufacturing industry. Such devices produce cast steel products, such as elongated bars, strips, or sheets, that are moved over rollers. Bearings are utilized to support the dynamic rotary motion of the rollers. These rollers operate under very high-loads, due to the weight of the steel products moved over them, and a low speeds (i.e.—low rpm's).

FIG. 1 is a cross sectional view of a bearing of the type which could be utilized in high-load, low-rpm applications such as mentioned above. FIG. 1 is illustrative of a typically constructed spherical roller bearing. This spherical roller bearing 1 as illustrated, includes an outer ring or race member 3. The outer ring 3 is annular in configuration and includes an outer diameter as well as an inner diameter defined by raceway surfaces 3a and 3b. The spherical roller bearing 1 further includes an annular inner race member 5 also comprising an inner diameter or bore, as well as an outer diameter defined by first and second race way surfaces 5a and 5b, as well as a central land surface 5c. A plurality of rolling elements 7 are disposed between the outer ring 3 and the inner ring 5. Each of the plurality of rolling elements 7 includes an outer rolling surface 7a. A cage member 9 acts to hold the rolling elements 7 in their proper position during operation.

Such bearing components are typically provided with what can be characterized as a relatively smooth surface finish. In this regard, typical surface roughness measurements for production bearings are on the order of:

| Component | Root Mean Square surface roughness measurement |
|---|---|
| Balls | 2–3 $\mu$in. |
| Ball Races | 6–10 $\mu$in. |
| Rollers | 8–12 $\mu$in. |
| Roller Races | 10–20 $\mu$in. |

These values can vary from manufacturer to manufacturer.

Surface roughness or texture can be measured in a number of ways. One typical way is to use an instrument that drags a stylus across a surface. As the stylus moves across the surface, the up and down movements are converted into a signal that is sent to a processor which produces an associated number value. One such number value is the "root mean square", or rms number. Another such number is the "$R_A$" or arithmetic average roughness number. These values are typically reported in microinches ($\mu$in) or micrometers ($\mu$m). The meanings and derivation of these values are well-known to those of ordinary skill in the art.

However, bearings utilized in high lead, low rpm applications, such as continuous casters, have exhibited problems. The high-load, low speed conditions presented by the operation of the continuous caster negatively impacts the ability of the lubricant present within the bearing to operate effectively between the dynamic frictional surfaces. Consequently, the dynamic frictional surfaces can be damaged, as evidenced by the appearance of polishing, micro spalling, regular spalling, etc.

Thus, it would be advantageous to provide dynamic frictional surfaces of bearing components which operate under high-load, low speed conditions with properties and characteristics which improves their performance and extends service life.

SUMMARY OF THE INVENTION

The present invention solves the above-mentioned problems, and others, through the use of a technique for the treatment of dynamic frictional surfaces.

According to the present invention, it has surprisingly been found that if such dynamic frictional surfaces are provided with a surfaces finish which has a roughness that exceeds the typical new surface finish roughness, such surfaces exhibit unexpectedly superior benefits when utilized under high-load, low speed applications.

According to one aspect, the present invention provides a method of improving the performance and service life of a new bearing component, the component having at least one dynamic frictional surface the method comprising: subjecting the at least one dynamic frictional surface to a surface roughening operation thereby providing the surface with a surface roughness value $R_A$ of 18–80 $\mu$in, preferably greater than 24 $\mu$in, and most preferably 30–36 $\mu$in.

BRIEF DESCRIPTION OF THE DRAWING FIGURES

FIG. 1 is a partial cutaway view of a typical spherical rolling bearing construction;

DETAILED DESCRIPTION OF THE INVENTION

According to the present invention, a surface treatment is applied which results in a surface roughness that exceeds typical surface roughness values for such components.

The method of the present invention is especially suited for metal surfaces.

The method of the present invention is especially suited for application to bearing surfaces utilized in high-load, low-rpm environments. The method of the present invention is particularly well-suited for application to raceway surfaces of inner and/or outer races of a bearing. For purposes of this disclosure, the term "high-load" environment refers to a condition under which the bearing and its components experience conditions such that C/P<10. Here, "C" refers to the capacity or maximum load tolerable by the bearing. For low rpm applications, this load is measured as the static capacity. The denominator "P" refers to the load applied to the bearing while in use. In a continuous caster bearing, the C/P value is typically 2–7. Further, for purposes of this disclosure, the term "low speed" environment refers to 0.5–10 revolutions per minute (rpm's).

The method of the present invention can comprise an additional procedure applied to surfaces of newly manufactured components that have already been provided with a relatively smooth surface finish. Alternatively, the method of the present invention can comprise the originally applied surface finish of a newly manufactured component.

Any suitable techinque can be utilized in the method of the present invention, so long as the result is a relatively rough surface is provided that achieves the objectives of the present invention.

Suitable techniques can include: shot blasting or peening; milling; vibratory finishing; sand blasting; and abrasive grinding.

According to a preferred embodiment, a surface finish applied according to the principles of the present invention has a surface roughness value, $R_A$, of approximately 18–80 $\mu$in, preferably greater than 24 $\mu$in, and more preferably 30–36 $\mu$in.

In the embodiment where the method of the present invention is applied to components of a bearing, the raceways of the inner and/or outer races are provided with an $R_A$ which is approximately 18–80 $\mu$in preferably greater than 24 $\mu$in, and most preferably 30–36 $\mu$in.

Figure 2A:
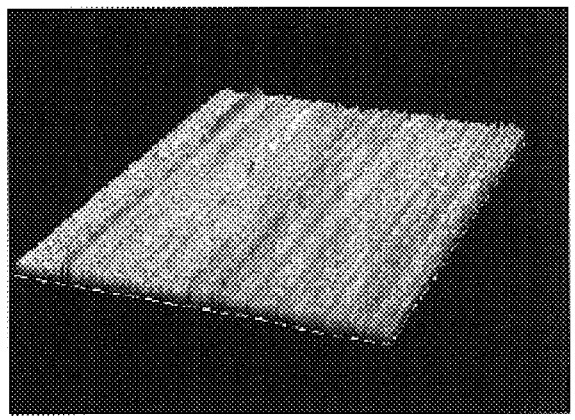
FIG. 2a is a topographical image of a surface of an inner bearing ring provided with a typical new surface finish.
Figure 2B:
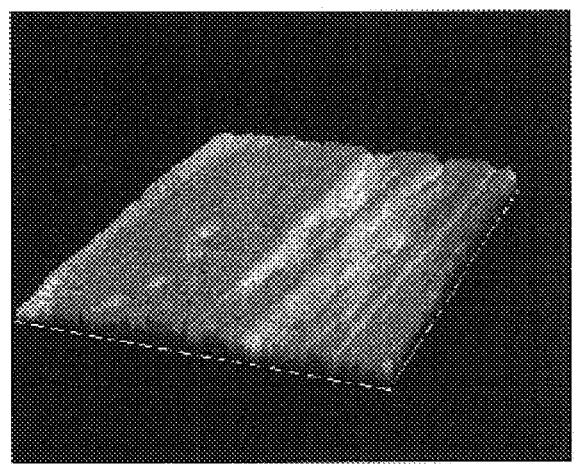
FIG. 2b is a topographical image of an inner bearing ring surface having a surface finish applied according to the principles of the present invention.
Figure 2C:
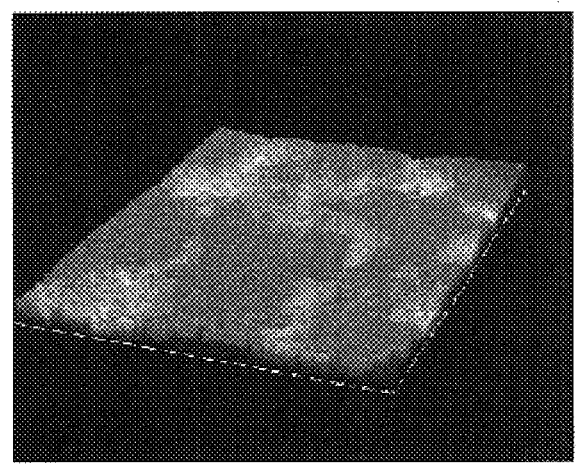
FIG. 2c is a topographical image of a surface of an inner bearing ring component having a surface finish applied according to the principles of the present invention, after operation of the bearing in a high-load, low rpm environment.

In order to illustrate the differences between a surface finish applied according to the principles of the present invention and a typical surface finish applied to bearing components, reference is hereby made to FIGS. 2a–2c.

FIG. 2a is a topographical image of a surface of an inner ring of a bearing component. The surface finish illustrated in FIG. 2a is a new surface finish applied according to typical manufacturer specifications.

By contrast, FIG. 2b illustrates a similar surface on an inner ring bearing component which has been applied according to the principles of the present invention. As shown in the topographical image of FIG. 2b, the surface finish of the present invention includes various peaks and valleys and other discontinuities which gives it a generally rougher appearance and topography of that of the new surface finish illustrated in FIG. 2a.

FIG. 2c is a topographical image of a surface finish applied according to the principles of the present invention for an inner ring bearing surface, after the inner ring has been in operation.

As shown in the topographical image of FIG. 2c, the surface finish of the present invention maintains many of the peaks, valleys and other surface discontinuities which were originally applied during finishing.

While not intended to be limited to any particular theory or mechanism of operation, it is believed that the surface finish applied according to the principles of the present invention with its various surface valleys, peaks and other discontinuities, serve to better retain lubricant during operation of the component in the above-described high-load, low rpm environments.

Results obtained by utilizing bearing components provided with a finish according to the principles of the present invention have demonstrated that the benefits of providing the surface with the various peaks, valleys and other discontinuities, which act to better retain lubricant, offset any negative impacts, such as increased friction which could be caused by the rougher surface finish. This is particularly true for new bearing components when installed in high-load, low rpm applications.

For purposes of illustration, an exemplary embodiment of the present invention will now be described in detail.

As previously noted, a surface finish according to the principles of the present invention can be applied to newly manufactured bearing components.

The present invention can be applied to stock bearings which have been manufactured such that the components thereof are provided with a typical relatively smooth surface finish. In this aspect, the stock bearings would be disassembled, cleaned and identified. The disassembled components would then be subjected to a surface finishing process according to the present invention.

Alternatively, the various bearing components can be initially manufactured with a surface finish which is in conformance with the principles of the present invention.

According to the illustrative embodiment, the bearing races (e.g.—inner and outer rings), rollers, and cages are analyzed and visually inspected.

The inner and outer races are subjected to an abrasive grinding process. One suitable device for grinding comprises a polishing head with an abrasive grinding wheel disposed thereon. The dynamic frictional surfaces (i.e.— raceways) of the inner and outer rings (or races) are subjected to a primary grinding operation utilizing 60 grit abrasive. A secondary grinding step is also included utilizing 180 grit abrasive media. The cycle time of the grinding operation is 4 minutes.

As previously noted, the surface finish provided to the various bearing components according to the principles of the present invention, including the above-mentioned illustrative embodiment, has an approximately 18–80 $\mu$in, preferably greater than 24 $\mu$in, most preferably 30–36 $\mu$in.

Bearing components provided with a surface finish according to the principles of the present invention have been operated in high-load, low rpm environments and have exhibited significantly improved results when compared with new bearing components provided with dynamic frictional surfaces having a typical relatively smooth surface finish. Namely, inner bearing rings or races in which the dynamic frictional surfaces thereof have been provided with a conventional surface finish have been installed and operated in a continuous caster device. For purposes of comparison, an inner bearing ring provided with a surface finish according to the principles of the present invention was also installed in the same device, and operated under similar conditions.

Upon removal and inspection of the inner bearing rings, those rings provided with a typical relatively smooth surface finish significant polishing, micro spalling, and regular spalling. These signs are indicative of inadequate lubrication.

By contrast, the inner rings provided with a surface finish according to the principles of the present invention exhibited much less polishing, and no visible micro spalling or regular spalling. Thus, it is believed that the surface finish which is provided according to the principles of the present invention, including various surface valleys, peaks and other discontinuities, serve to better retain lubricant, especially when utilized under high-load, low rpm applications, and thereby have proven to possess increased performance and longer service lifetimes when compared with conventionally finished dynamic frictional surfaces.

While the present invention has been described by reference to the above-mentioned embodiments, certain modifications and variations will be evident to those of ordinary skill in the art. Therefore, the present invention is to limited only by the scope and spirit of the appended claims.

What is claimed is:

1. A method of improving the performance and service life of a new bearing component, the component having at least one dynamic frictional surface the method comprising:

subjecting the at least one dynamic frictional surface to a surface finishing operation thereby providing the surface with a finish having a surface roughness value $R_A$ of greater than 30 $\mu$in and less than approximately 80 $\mu$in.

2. The method of claim 1, wherein the surface roughness value $R_A$ is no greater than approximately 36 $\mu$in.

3. The method of claim 1, wherein the dynamic frictional surface is a metal surface.

4. The method of claim 1, wherein the surface finish comprises an originally-applied surface finish of the new bearing component.

5. The method of claim 1, wherein the surface finishing operation comprises at least one of: shot blasting or peening; milling; vibratory finishing; sand blasting; and abrasive grinding.

6. The method of claim 1, wherein the dynamic frictional surface comprises a raceway of an inner or outer bearing race.

7. A method of improving the performance and service life of a new bearing component, the component having at least one dynamic frictional surface, the method comprising:

applying a new surface finish to the dynamic frictional surface; and subjecting the new surface finish of the dynamic frictional surface to a surface roughening operation thereby providing the surface with a surface roughness value $R_A$ of greater than 30 $\mu$in and less than approximately 80 $\mu$in.

8. The method of claim 7, wherein the surface roughness value $R_A$ is not greater than approximately 36 $\mu$in.

9. The method of claim 7, wherein the dynamic frictional surface is a metal surface.

10. The method of claim 7, wherein the surface roughening operation comprises at least one of: shot blasting or peening; milling; vibratory finishing; sand blasting; and abrasive grinding.

11. The method of claim 7, wherein the dynamic frictional surface comprises a raceway of an inner or outer bearing race.

12. A method of improving the performance and service life of a bearing component, the component having at least one dynamic frictional surface, the method comprising:

subjecting the at least one dynamic frictional surface to a surface finishing operation thereby providing the surface with a finish having a final surface roughness value $R_A$ of greater than 30 $\mu$in and less than approximately 80 $\mu$in.

13. The method of claim 12, wherein the final surface roughness value $R_A$ is no greater than approximately 36 $\mu$in.

* * * * *